R. GOLDSCHMIDT.
HIGH FREQUENCY GENERATOR.
APPLICATION FILED MAY 9, 1911.
1,104,257.
Patented July 21, 1914.
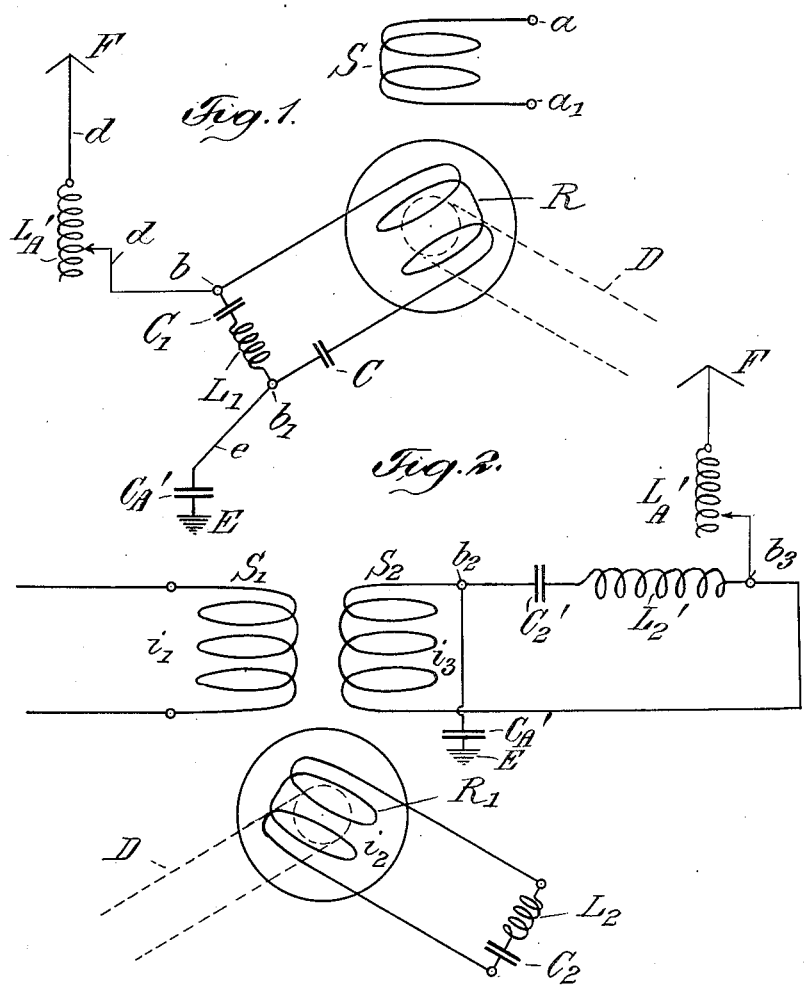
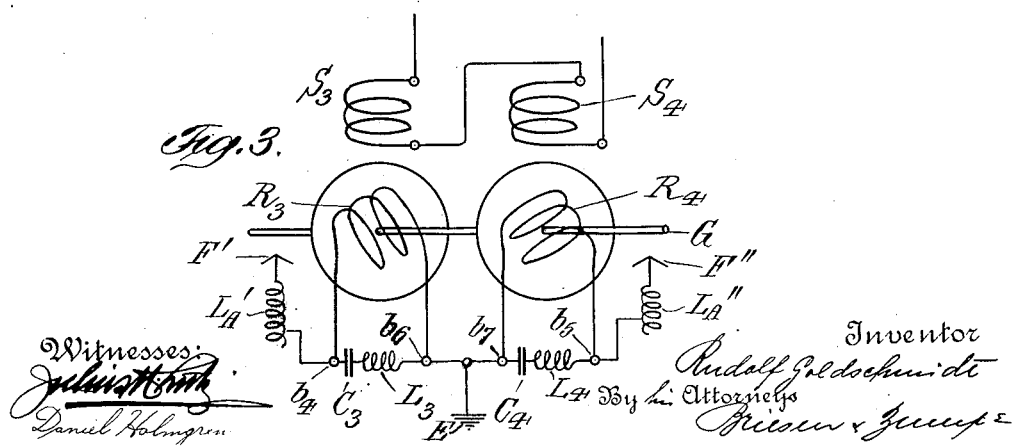

UNITED STATES PATENT OFFICE.

RUDOLF GOLDSCHMIDT, OF DARMSTADT, GERMANY.

HIGH-FREQUENCY GENERATOR.

1,104,257.　　　　Specification of Letters Patent.　　Patented July 21, 1914.

Application filed May 9, 1911. Serial No. 625,988.

*To all whom it may concern:*

Be it known that I, RUDOLF GOLDSCHMIDT, a subject of the Grand Duke of Hesse, and residing at Darmstadt, in the Grand Duchy of Hesse, Germany, have invented a new and Improved High-Frequency Generator, of which the following is a specification.

This invention relates to a novel generator for producing electric currents of high frequency which possesses the characteristic feature that its stator and rotor are provided with monophase windings in lieu of the polyphase windings hitherto generally employed.

The following comparison between machines provided with polyphase windings and machines having monophase windings will clearly demonstrate the advantages of the latter. It is an acknowledged principle in practice that an excessive high speed of the rotor should be avoided, but such a high speed can only be obviated by correspondingly increasing the number of poles of the machine. As this number however increases with the number of phases generated and as the number of poles in turn determines the diameter of the generator, it is obvious that polyphase generators will assume objectionably large dimensions under the conditions cited. Applicant overcomes this objection and generates monophase current by providing the stator as well as the rotor of the machine with monophase windings, so that a corresponding reduction of the number of poles is obtained without reducing the frequency of the generated monophase current when compared with the above described generation of polyphase current, and without having in any wise to resort to the above mentioned undesirable high speed of the rotor. A single frequency current, however, can only be obtained, in the member inductively acted upon, when the inductive member produces a perfect rotary field; accordingly it has hitherto been necessary to use windings carrying at least two phases on the inductive member, because a single phase winding *per se* will not set up a rotary field. To nevertheless obtain the above mentioned advantages of a monophase winding, my invention is based on the fact that a monophase field may be considered as made up of two fields rotating synchronously in opposite directions and each having half the maximum value of the monophase field. These two rotating fields will induce in the rotor windings two frequencies, one of which is nullified according to my invention by making use of the principle of resonance, so that in this way one of the frequencies can be suppressed while the other is simultaneously developed for use in a circuit of utilization.

In the accompanying drawing: Figure 1 is a diagram of a high-frequency generator embodying my invention; Fig. 2 a diagram of a modification thereof, and Fig. 3 a diagram of a further modification.

Referring to Fig. 1, S indicates a monophase stator winding, the terminals $a$, $a_1$ of which are connected to a suitable supply of alternating current having the frequency $W_1$. Within the two rotary fields of which the single phase pulsating field of the stator may be considered to be the equivalent, is rotated the monophase rotor winding R with the alternating speed $W_0$, the rotor being driven by a belt D or otherwise. In this way, the effect of two frequencies $W_2'$ and $W_2''$ will arise in the rotor winding according to the following formulas:

$$W_2' = W_1 + W_0$$

and $$W_2'' = W_1 - W_0.$$

The rotor winding is connected to a condenser C which is tuned to the self induction of such winding for the frequency not desired, while the condenser $C_1$ and the inductance $L_1$ interpolated between the points $b$ and $b_1$ which are respectively connected to the rotor winding and condenser C, are tuned to the same frequency. The antenna F is by wire $d$ connected to point $b$, while point $b_1$ is through wire $e$ grounded as at E. In this way, the circuit which is composed of the rotor winding, condenser C, inductance $L_1$, and condenser $C_1$ will serve for the passage of the frequency not desired, while the frequency desired is conducted from the points $b$ and $b_1$ to the antenna and ground respectively. In order to eliminate disturbances in the circuit of utilization which may have their origin in the formation of harmonic oscillations and other causes, this circuit is preferably provided with means for tuning it to the frequency desired, for which purpose a tuning coil $L_A'$ and a condenser $C_A'$ are respectively inserted between the point $b$ and the antenna and between the point $b_1$ and the ground.

My invention is of particular importance whenever it is desired to change the frequency furnished by a high frequency generator without changing the rotary speed thereof. This is effected by making use of a supplementary transformer constructed in accordance with this invention, the rotary speed of which may be changed more easily and quicker than that of the generator. If for instance the frequency $f_1$ furnished by the main generator is 50000 and the frequency $f_0$ of the transformer is 10000, the main frequency may be altered from 40000 to 60000. With a transformer built for 10000 frequencies, a regulation of twice said amount may thus be obtained.

In Fig. 2, two stators $S_1$, $S_2$ are shown to be placed opposite a common rotor $R_1$ which is driven by belt D or in other suitable manner with the alternating speed $W_0$. The winding of rotor $R_1$ is connected to a condenser $C_2$ and an inductance $L_2$. If a current $i_1$ of the frequency $W_1$ is sent through the winding of stator $S_1$, there is produced in the winding of rotor $R_1$, a current $i_2$ of the frequency $$W_2' = W_1 + W_0,$$

it being assumed that the frequency $W_1 - W_0$ be nullified. The current $i_2$ thus produced reacts on the stator $S_2$ and here induces a current $i_3$ having a frequency $$W_2' + W_0 = W_1 + 2W_0,$$

it being also assumed that the frequency $W_2' - W_0$ be eliminated. In this way, a multistage transformation of frequencies may be readily obtained, it being obvious that the steps for raising the frequency may be increased by arranging a second rotor in the field of stator $S_2$ and so on. On the other hand, if it is desired to attain the increase of the frequency in one stage only, continuous current may be sent through the winding of stator $S_1$, so that the winding of rotor $R_1$ is employed as a generator-armature as well as a primary alternating current winding. The circuit of utilization may be established in various manners, the drawing showing one end of the winding of stator $S_2$ connected at $b_2$ to a condenser $C_2'$ and an inductance $L_2'$, while the latter is connected to the other end of said stator winding. The antenna F and a tuning coil $L_A'$ are connected to the point $b_3$, while the point $b_2$ is connected to condenser $C_A'$ and ground E. With the connections described, the circuit $S_2$, $C_2'$, $L_2'$ is tuned to the frequency not desired, while the antenna together with the parts $L_A'$ and $C_A'$ are tuned to the desired frequency.

For the purpose of the invention as defined in the appended claims, a plurality of stators and a single rotor are to be considered equivalents of a plurality of rotors and a single stator.

The invention may also be adapted for the generation of multiphase current as is for instance used for certain telegraphic purposes, such an arrangement being illustrated in Fig. 3. Here a plurality of stators $S_3$, $S_4$ are mounted side by side and the corresponding rotors $R_3$, $R_4$ are mounted on a common shaft G, the number of stator and rotor pairs corresponding to the phase number, while these parts are locally displaced in accordance with time phase differences. The windings of rotors $R_3$, $R_4$ are connected to condensers $C_3$, $C_4$ and inductances $L_3$, $L_4$ respectively to establish the desired resonant rotor circuits. With the wiring shown in Fig. 3, it is assumed that a pair of antennæ F' and F'' be supplied with currents of different phases. These antennæ are respectively connected over tuning coils $L_A'$ and $L_A''$ to the points $b_4$, $b_5$ while the points $b_6$, $b_7$ are grounded as at E.

I claim:

1. A high frequency generator comprising rotor and stator parts, each provided with single phase windings, a condenser, and connections between the condenser and the windings of the rotor adapted to establish a resonant rotor circuit.

2. A high frequency generator comprising a stator having single phase windings adapted to receive alternating current, a rotor having single phase windings, a condenser, and connections between the condenser and the windings of the rotor constituting a resonant circuit for nullifying one of the frequencies generated in the rotor circuit.

3. A high frequency generator comprising a plurality of stators, each being provided with single phase windings, a rotor movable in the fields of said stator windings and also provided with single phase windings, and tuning agencies connected to one set of said single phase windings.

4. A high frequency transformer comprising a first stator having single phase windings and adapted to receive an exciting current, a second stator having single phase windings, a rotor arranged opposite both of said stators and having single phase windings, a condenser, and connections between the condenser and the windings of the second stator and adapted to establish a resonant second stator circuit.

5. A high frequency transformer comprising a first stator having single phase windings and adapted to receive an exciting current, a second stator having single phase windings, a rotor arranged opposite both of said stators and having single phase windings, a first condenser, connections between said first condenser and the windings of the rotor and adapted to establish a resonant rotor circuit, a second condenser, and connections between said second condenser and the windings of the second stator and adapted to establish a resonant second stator circuit.

In testimony whereof I affix my signature in presence of two witnesses.

PROF. DR. RUDOLF GOLDSCHMIDT.

Witnesses:
 HENRY HASPER,
 WOLDEMAR HAUPT.